United States Patent [19]

Haubert

[11] 4,334,852
[45] Jun. 15, 1982

[54] APPARATUS FOR BLOW MOLDING A HOLLOW PLASTIC ARTICLE HAVING A RELATIVELY WIDE NECK

[75] Inventor: Thomas R. Haubert, Holland Landing, Canada

[73] Assignee: Supreme Casting & Tooling, Rexdale, Canada

[21] Appl. No.: 248,734

[22] Filed: Mar. 30, 1981

Related U.S. Application Data

[62] Division of Ser. No. 55,204, Jul. 5, 1979, abandoned.

[51] Int. Cl.³ .............................................. B29C 17/07
[52] U.S. Cl. .................................. 425/525; 264/531; 264/533; 425/531; 425/535; 425/537
[58] Field of Search ................ 425/525, 535, 537, 527, 425/531; 264/531, 533

[56] References Cited

U.S. PATENT DOCUMENTS

| | | | |
|---|---|---|---|
| 3,032,809 | 5/1962 | Willard | 425/525 X |
| 3,371,376 | 3/1968 | Fischer et al. | 264/531 X |
| 3,733,384 | 5/1973 | Gerlovich et al. | 425/535 X |
| 4,092,392 | 5/1978 | Dunbeker | 264/531 X |
| 4,176,153 | 11/1979 | Weiler et al. | 264/524 |

FOREIGN PATENT DOCUMENTS

| | | | |
|---|---|---|---|
| 1178580 | 9/1964 | Fed. Rep. of Germany | 264/531 |
| 1479216 | 5/1969 | Fed. Rep. of Germany | 264/531 |
| 1373990 | 8/1964 | France . | |

*Primary Examiner*—Jan H. Silbaugh
*Attorney, Agent, or Firm*—Rogers, Bereskin & Parr

[57] ABSTRACT

The disclosure relates to a method and apparatus for moulding hollow plastic articles each having a relatively wide neck portion. The method includes the step of mechanically expanding an end portion of a tubular parison from which the article is to be moulded, and introducing into the expanded end portion of the parison a mandrel which cooperates with the mould to form the neck of the article. Subsequently, the parison is expanded by internal air pressure to form the remainder of the article. Movable mould inserts for relieving pressure around the neck of the article are also disclosed.

6 Claims, 6 Drawing Figures

APPARATUS FOR BLOW MOLDING A HOLLOW PLASTIC ARTICLE HAVING A RELATIVELY WIDE NECK

This is a division, of application Ser. No. 055,204 filed July 5, 1979, now abandoned.

This invention relates generally to the art of blow moulding hollow articles of plastic material, and is concerned in particular with an improved blow moulding method and apparatus.

Blow moulding is a well known technique used for manufacturing hollow plastic articles such as bottles. Typically, a tube or "parison" of plastic material in a hot, mouldable condition is positioned between two halves of a partible mould having a mould cavity of a shape appropriate to the required external shape of the article to be moulded. The mould halves are closed around the parison and pressurized air is introduced into the interior of the parison to cause it to expand and conform to the shape of the mould cavity. The mould cools the plastic material to its final rigid shape and the mould is then opened and the article removed. The parison is normally extruded through a die directly into position between the mould halves; in this case, the overall process is referred to as extrusion blow moulding.

Articles such as bottles having relatively wide cylindrical body portions and narrower necks can be blow moulded relatively easily. However, difficulties are often encountered in blow moulding articles having somewhat more unusual shapes. For example, it is difficult to successfully blow mould an article which has a relatively large diameter neck and a body portion of corrugated or other unusual shape; the body portion may be of bellows-like form so as to allow for longitudinal extensibility and compressibility of the article. In order to sucessfully mould the corrugations defining the bellows-like portion of the article, a relatively small diameter parison must be used. If the parison has too large a diameter, "webs" will be formed between the corrugations and the extensibility and compressibility of the bellows-like portion of the article will be lost. On the other hand, with a relatively small diameter parison it is difficult to successfully form the neck portion of the article.

As far as applicant is aware, the prior art has failed to provide a solution to this problem. The following prior art United States patents were considered in the preparation of this application:

U.S. Pat. No. 1,514,183 (Steele et al)
U.S. Pat. No. 3,164,646 (Fischer)
U.S. Pat. No. 3,080,614 (Adams)
U.S. Pat. No. 3,303,249 (Strauss)
U.S. Pat. No. 3,311,950 (Strauss)
U.S. Pat. No. 3,278,665 (Harrison).

It is an object at the present invention to provide an improved blow moulding method and apparatus which may be used for producing articles of the general form referred to above.

According to one aspect of the invention there is provided a method of moulding a hollow plastic article having a body portion and a relatively wide open neck at one end. The method involves a first step of providing a partible mould comprising mould parts which can be opened and closed and which, when closed define a mould cavity of a shape appropriate to the required external shape of the article, said mould cavity having adjacent one end thereof surface portions for defining said neck of the article. The mould parts are opened and a relatively narrow tubular parison of a thermoplastic material in a mouldable condition is positioned between the mould parts. The parison includes an end portion which extends beyond said one end of the mould cavity. That end portion of the parison is then mechanically expanded to an extent sufficient to cause the portion of the parison which is to form the neck of the article to expand to a size and shape approximating the required final size and shape of the neck of the article, while leaving said end of the parison unobstructed. A mandrel is introduced into the interior of the parison through its expanded end and is shaped to cooperate with said surface portions of the mould cavity to form the neck of the article. The end of the parison opposite said end portion is closed and the mould parts are closed. Air is then introduced into the interior of the parison to cause the parison to expand whereby the parison adopts the shape of the mould cavity. The parison is allowed to cool at least to a semi-rigid state in which it can be handled and the mould parts are opened to permit removal of the moulded article.

According to another aspect of the invention there is provided apparatus for moulding hollow plastic articles each having a body portion and a relatively wide neck at one end. The apparatus includes a partible mould comprising mould parts movable between open and closed positions and defining in said closed position a mould cavity of a shape appropriate to the required external shape of the article, said mould cavity having adjacent one end thereof surface portions for defining said neck of the article. Means is provided for positioning between said open mould parts, a relatively narrow mouldable tubular parison with an end portion of the parison extending beyond said one end of the mould cavity. The apparatus further includes means mechanically engageable with said end portion of the parison and adapted to expand the parison to an extend sufficient to cause the portion of the parison which is to form the neck of the article to adopt a size and shape approximating the required final size and shape of the neck of the article while leaving the open lower end of the parison unobstructed. A mandrel is provided and is movable with respect to said mechanically engageable means through said open lower end of the parison between a retracted position clear of the mould parts and an advanced position within the parison, the mandrel being shaped to cooperate with said portions of the mould cavity when the mould is closed to form the neck of the article. Means is provided for closing the end of the parison opposite said end portion and the apparatus further includes means for introducing air into the interior of the parison to cause the parison to expand whereby the parison adopts the shape of the mould cavity.

In order that the invention may be more clearly understood, reference will now be made to the accompanying drawings which illustrate a preferred embodiment of the invention by way of example, and in which.

Figure 1:
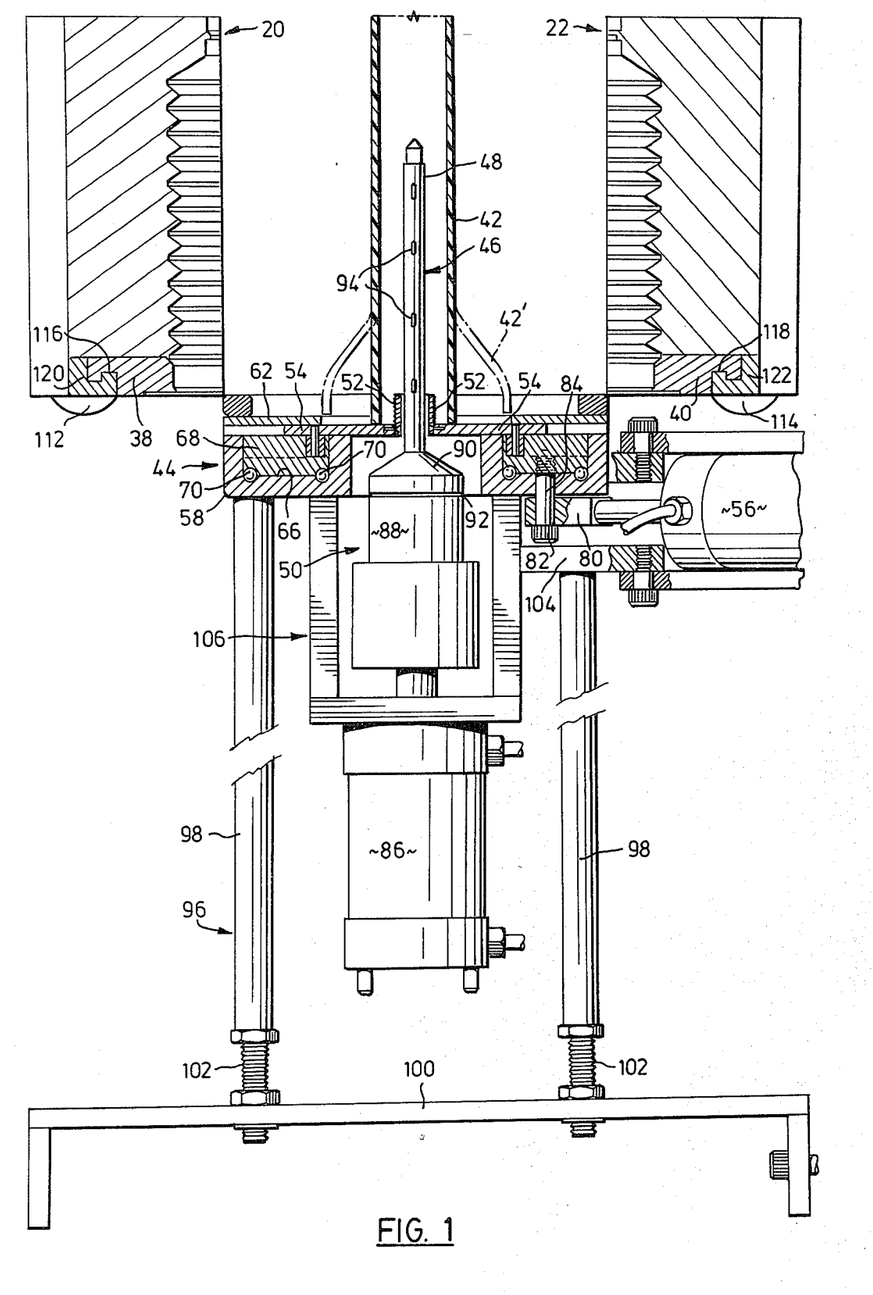
FIG. 1 is a side elevation, partly in section, of a moulding apparatus according to the invention, having mould parts shown in the open condition.
Figure 2:
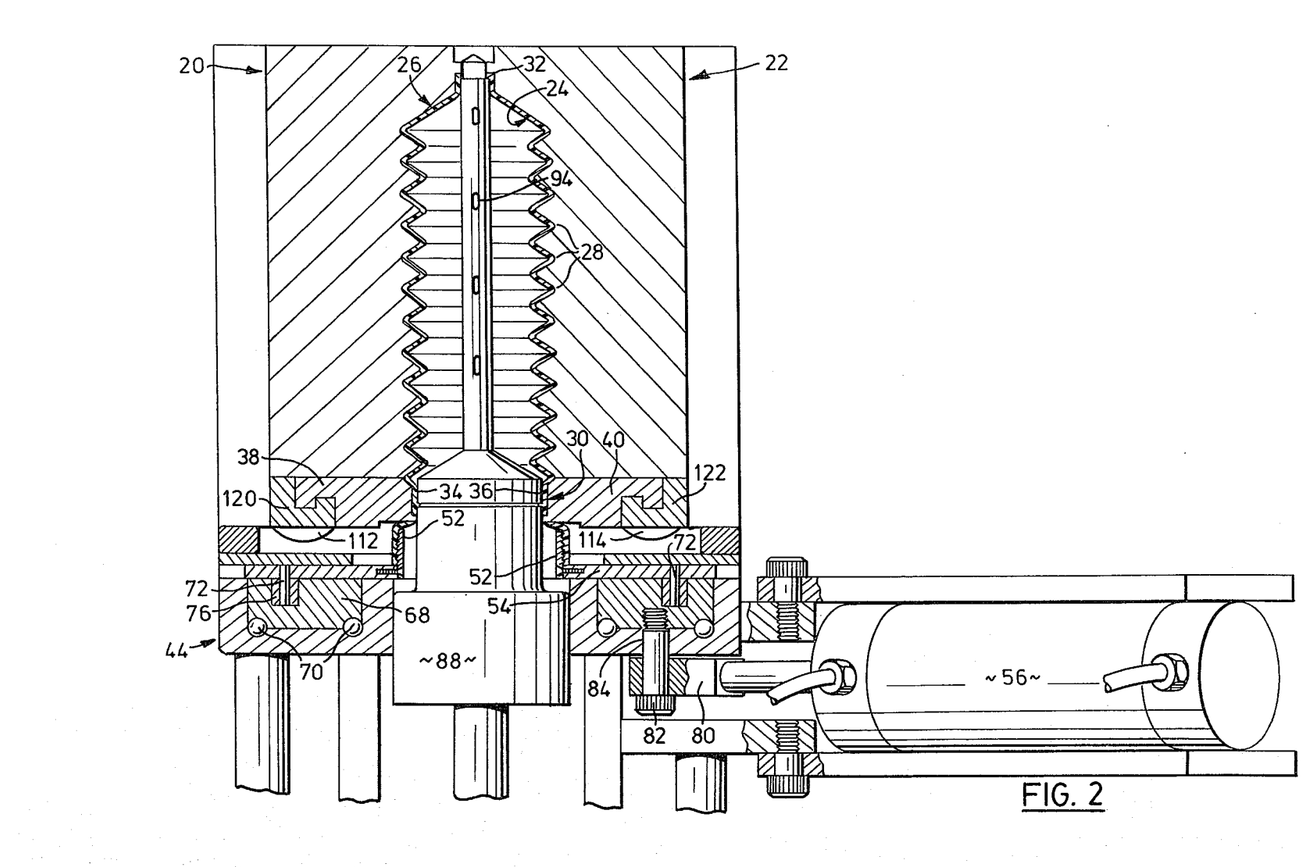
FIG. 2 is a view similar to FIG. 1 but with the mould parts shown closed.

Referring first to FIGS. 1 and 2, the blow moulding apparatus includes a partible mould comprising first and second mould parts denoted 20 and 22 respectively. In this particular embodiment, each part forms one half of the mould and the mould halves are movable between the open position in which they are shown in FIG. 1 and the closed position of FIG. 2. For clarity of illustration, the drawings do not show supports for the mould halves or the means employed to move them between the open and closed positions. These components are entirely conventional and will be well known to persons skilled in the blow moulding art.

The mould halves are machined to define specially shaped recesses 20a and 22a respectively which co-operate when the mould is closed to define a mould cavity generally indicated by reference numeral 24 in FIG. 2. The mould cavity is of a shape appropriate to the required external shape of the article to be moulded. In this case, the article is visible in longitudinal section at 25 in FIG. 2 and includes a bellows-like body portion 28 having a relatively wide neck 30 at one end and a relatively narrow opening defined by a sleeve like end portion 32 at its opposite end. Mould cavity 24 is shaped to define the corrugations of body portion 28 and includes surface portions 34 and 36 which form the neck 30 of the article during moulding. In this particular embodiment, these surface portions are defined by movable mould inserts to 38 and 40 which are more particularly illustrated in FIGS. 4, 5 and 6 and which will be described later in connection with those views.

Referring back to FIG. 1, the article described above is moulded from a tubular parison 42 of a thermoplastic material. The parison is shown in the position it occupies immediately before the mould halves 20 and 22 are closed prior to commencement of the actual blow moulding operation. At this time, the parison will be in a mouldable condition; that is, the plastic material of which the parison is made will be hot and in a form in which it can be relatively easily deformed by the application of internal air pressure. Normally, the parison will in fact be formed by a section severed transversely from a tubular extrusion fed continuously or intermittently to the moulding apparatus from an extruder as is conventional in the blow moulding art. In FIG. 1, the parison is shown supported from the extruder.

It will be appreciated from a comparison of FIGS. 1 and 2 that parison 42 is of relatively small diameter and must be expanded significantly to form article 26. As discussed previously, the diameter of the parison must be limited in order to avoid the formation of "webs" between the corrugations which would tend to inhibit the longitudinal extensibility and compressibility of the article. However, the fact that the parison is small makes it difficult to form the relatively large diameter neck 30 of the article. For this reason, the apparatus provided by the invention includes means (hereinafter referred to as a "stretcher mechanism") for mechanically engaging and expanding the lower end portion of the parison. The mechanism is generally indicated by the reference numeral 44 in FIGS. 1, 2 and 3, and will be described in detail with reference to those views.

Before referring to the stretcher mechanism, however, it will be convenient to identify a mandrel assembly 46 which appears in the center of the stretcher mechanism as seen in FIGS. 1 and 2. Mandrel assembly 46 includes a so called "blow pin" 48 through which pressurized air is introduced into the interior of the parison during moulding, and a body portion 50 from which pin 48 projects and which co-operates with the mould parts 20 and 22 to form the neck of the moulded article, all as will be described later.

Stretcher mechanism 44 includes a plurality of parison engaging "fingers" arranged in an annular series around the mandrel blow pin 48 adjacent the lower end of the mould. Two of these fingers are visible at 52 in FIGS. 1 and 2; however, by reference to FIG. 3, will be seen that eight such fingers are in fact provided and are spaced equally about the blow pin. Each finger projects upwardly from a horizontally movable slide 54 parallel to the longitudinal axis of blow pin 48. The slides 54 are movable simultaneously to move the fingers between the normal rest positions in which they are shown in FIG. 1, in which the fingers 52 are disposed closely adjacent to the blow pin 48 (and within the lower end of parison 52) and retracted positions as shown in FIG. 2, in which the fingers have been moved outwardly to expand the lower end portion of the parison generally as indicated at 42' in FIG. 1.

Figure 3:
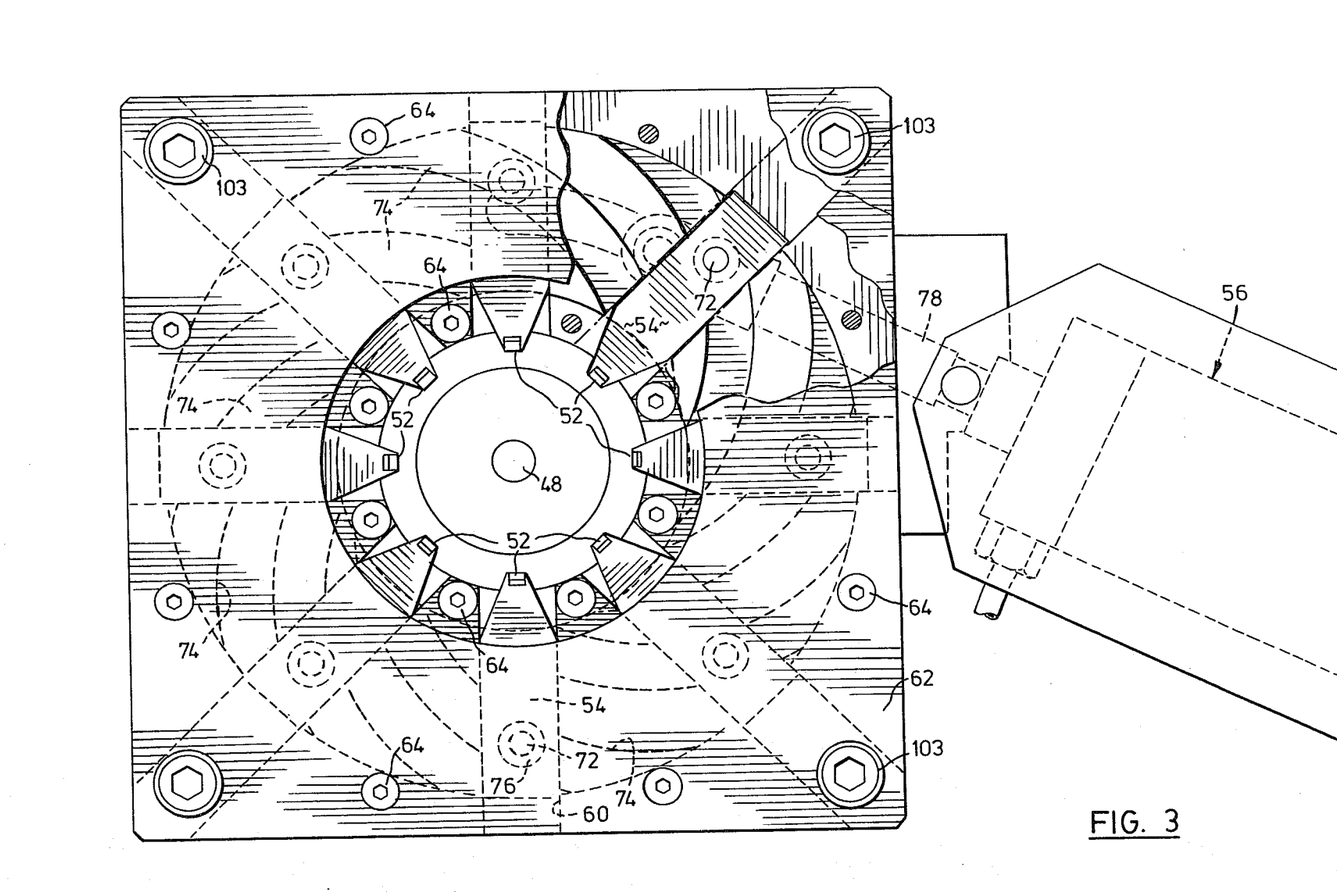
FIG. 3 is a plan view corresponding to FIG. 2 but with the mould parts omitted.

Movement of the fingers between their rest positions and retracted (parison expanding positions) is controlled by a pneumatic cylinder and ram device generally denoted 56. The slides 54 which carry the fingers 52 are mounted in a housing 58 for longitudinal sliding movement in directions radially of the axis of blow pin 48. Thus, referring to FIG. 3, each slide 54 is received in a radial groove or slideway 60 in a cover plate 62 secured by bolts 64 to housing 58 so as to retain the slides in their respective grooves. As seen in FIG. 3, the slides are substantially in their fully retracted positions.

Below the slides, housing 58 is shaped to define an annular recess 66 (FIGS. 1 and 2) which receives an annular member 68 forming an actuator ring for the fingers 52. Ring 68 is mounted for free turning movement in recess 66 by way of ballbearings 70. Each of the slides 54 is fitted with a pin 72 which depends from the slide and is received in an arcuate groove 74 (FIG. 3) in the upper face of ring 68. A bearing sleeve 76 is fitted around the lower portion of each pin 72 within groove 74. Similar groove and pin arrangements are provided for each of the slides 54. The grooves 74 in effect define cam tracks and are specially shaped so that angular movement of ring 68 causes all of the slides 54 to move radially in or out depending on the direction in which the ring is turned. For example, if ring 68 is turned in the counter-clockwise direction as seen in FIG. 3, the cam tracks 74 will all act on the associated bearing sleeves 76 and pins 72 to cause all slides 54 and associated fingers 52 to move inwardly towards the blow pin 48. Conversley, if the fingers 52 are in the rest (advanced) positions adjacent blow pin 48 and ring 68 is turned in the clockwise direction, the fingers will all simultaneously move outwards. The extent of this movement in either case is determined by the length of the cam tracks 74 and the angular extend through which ring 68 is turned. This angular movement of the ring is effected by the cylinder and ram device 56.

Referring back to FIGS. 1 and 2, the ram of device 56 is indicated at 78 and has a coupling 80 at its outer end. A link pin 82 extends vertically upwardly from coupling 80 through an arcuate slot 84 (see FIG. 3) in the bottom wall of housing 58 and it is secured to ring 68 at its upper end. Thus, as ram 78 is extended and retracted, ring 68 will move through discreet angular amounts. The amount of this angular movement will be determined by the stroke of ram 78, which will be selected as appropriate to the required movement of the fingers 52.

FIG. 1 illustrates how the slides 54 which support the fingers 52 also serve to define the position of the parison 42 prior to commencment of the blow moulding operation. Thus, the parison should be disposed so that a lower end portion thereof extends beyond the lower ends of the mould halves 20 and 22. This end portion of the parison is engaged by the fingers 52 of the stretcher mechanism 44 and is expanded thereby to an extent sufficient to cause the portion of the parison which is to form the neck 30 of the article to expand to a size approximating the required final size of the neck. Preferably, the parison should not be expanded beyond its required final size since otherwise there may be a tendency for the parison to become trapped or crimped when the mould halves close.

Expansion of the lower end portion of the parison also allows the body portion 50 of the mandrel assembly 46 to move upwardly into the parison as will be described. Thus, assembly 46 is axially movable from the retracted position in which is shown in FIG. 1 to the advanced position of FIG. 2. This movement is effected by a pneumatic cylinder and ram device 86 which is mounted in a vertical position below the mandrel assembly and the ram of which is coupled to said assembly. Thus, by extending the ram of device 86 the mandrel assembly is moved up into its advanced position.

It will be seen that the body portion 50 of the mandrel assembly 46 includes an inner part 88 which is of cylindrical shape and which has a conical top 90. Part 88 is shaped to co-operate with the surface portions 34 and 36 of mould cavity 24 to define the neck 30 of the moulded article 26. Thus, the part 88 is dimensioned so that its external diameter is less than the diameter defined by the surface portions 34 and 36 by an amount equal to the wall thickness of neck 30. Accordingly, the neck 30 will in effect be formed by compression between mandrel part 88 and the surfaces 34 and 36 rather than by blow moulding as such. Part 88 includes an annular groove 92 adjacent its upper end for defining a corresponding inwardly protuberant rib around neck 30 as is required in the finished article.

FIG. 2 shows the mandrel assembly 46 in its fully advanced position and it will be seen that the upper end portion of the blow pin 48 cooperates with the mould halves 20 and 22 to close the upper end of the parison and form the sleeve-like end portion 32 of article 26. Openings such as those indicated at 94 are provided in blow pin 48 for introducing air into the parison during blow moulding; thus the blow pin is coupled to a suitable air supply (not shown) as is conventional in the blow moulding art.

Reference numeral 96 in FIG. 1 indicates supporting structure for the stretcher mechanism 44 and the mandrel assembly 46. Four support columns, two of which are visible at 98 extend upwardly from a base plate 100 and are provided with screw adjusters 102 at their lower ends. At their upper ends, the four support columns are attached to the actuator housing 58 by four bolts 103 (FIG. 3). The device 86 for actuating the mandrel assembly 46 is carried by brackets 106 depending from housing 58.

Figure 4:
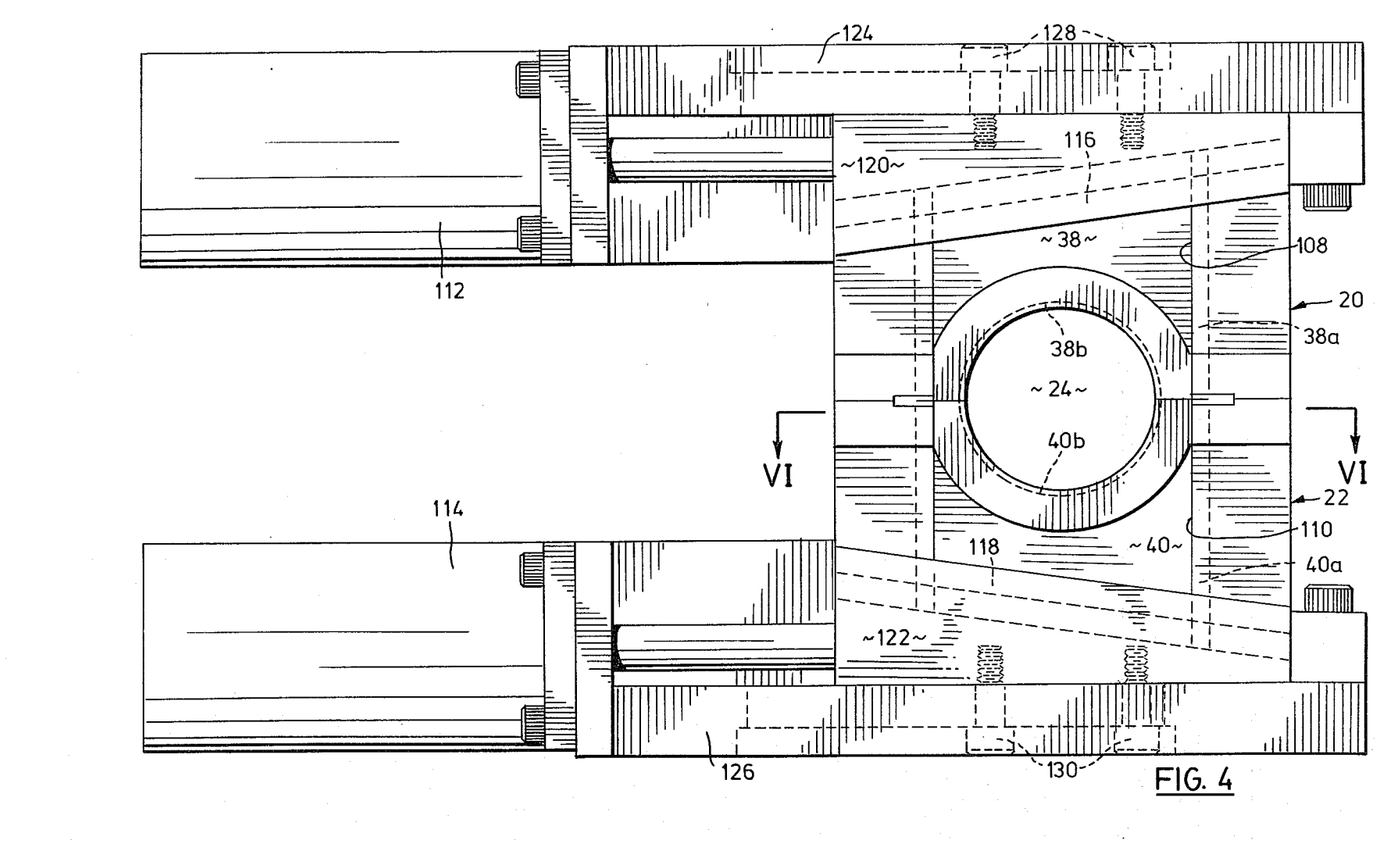
FIG. 4 is a view from below of the mould parts seen in FIGS. 1 and 2 and illustrates movable inserts of said mould parts, the inserts being shown in advanced positions.
Figure 5:
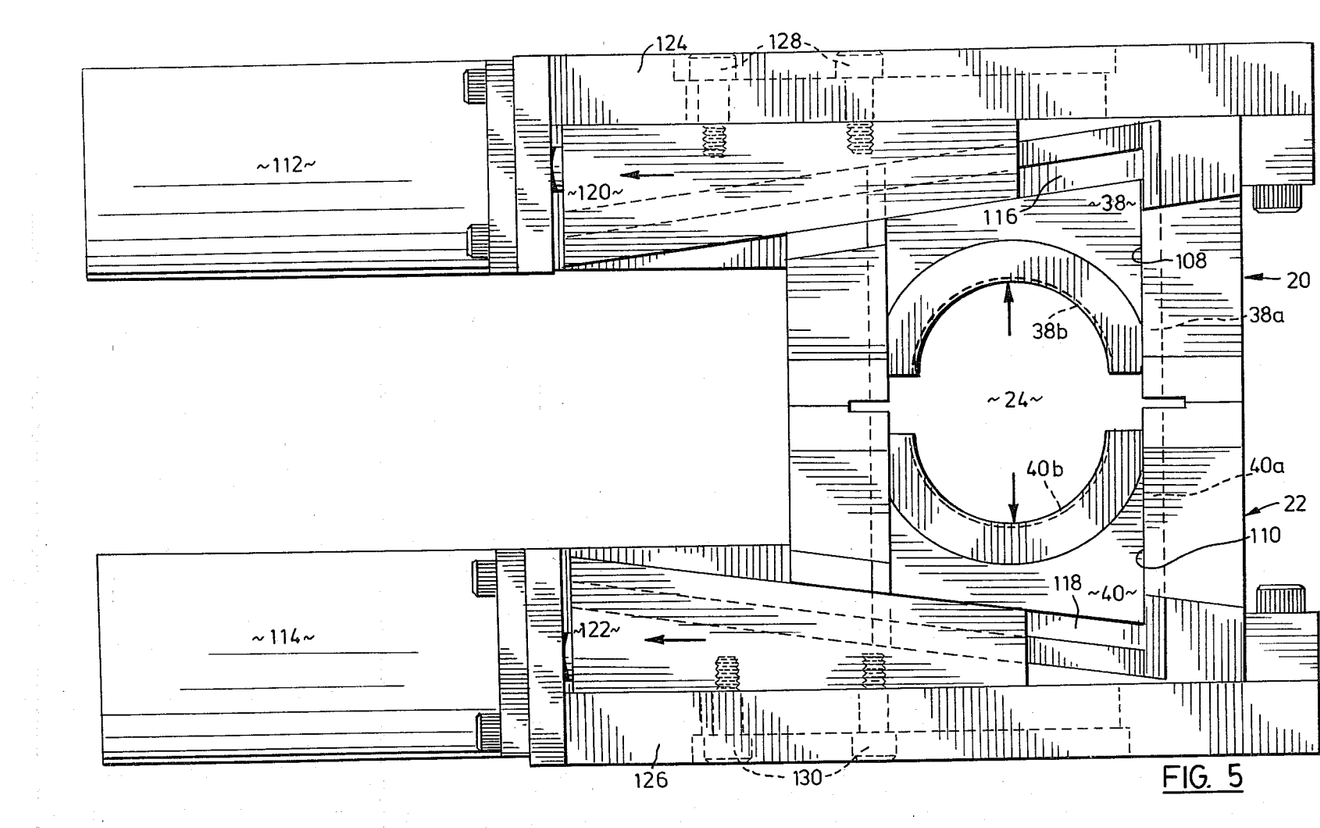
FIG. 5 is a view similar to FIG. 4 showing the inserts retracted.
Figure 6:
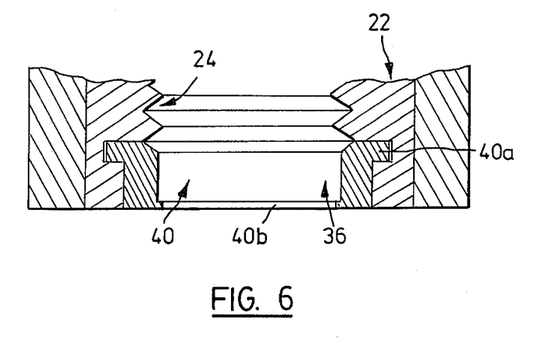
FIG. 6 is a sectional view on line V1—V1 of FIG. 4.

FIGS. 4, 5 and 6 illustrate the movable inserts 38 and 40 of the mould halves 20 and 22. FIGS. 4 and 5 show the mould halves in their closed positions as seen from below, but turned through 90° compared with FIGS. 1 and 2; thus, the joint line between the mould halves 20 and 22 would lie on section line V1—V1 of FIG. 4. Before referring in detail to these views, it may be helpful to briefly explain the purpose of the movable inserts 38 and 40. It will be recalled that an annular grove 92 (FIG. 2) is provided in the part 88 of mandrel assembly 46 which assists in forming the neck 30 of the moulded article, in order to provide a protuberant rib around the inner surface of neck 30. If the mandrel assembly 46 were withdrawn downwardly from the position in which it is shown in FIG. 2, with the mould tightly closed, the result would be to shear off the moulded rib on neck 30. The inserts 38 and 40 are designed to be retractable away from the mandrel to free the neck 30 of the moulded article and allow it to flex sufficiently to permit the mandrel to be withdrawn without damaging the moulded rib.

As seen in FIGS. 4 and 5, the mould halves 20 and 22 are provided in their bottom faces with respective parallel sided recesses 108 and 110 which receive the respective inserts 38 and 40. The recesses and associated inserts are shaped so that the inserts can slide towards and away from one another from normal moulding positions in which they are shown in FIG. 4 to retracted positions as shown in FIG. 5. FIG. 6 illustrates the shape of insert 40, which is also representative of insert 38. Thus, it will be seen that insert 40 is formed with a projecting flange 40a which is received in a complementary undercut portion of the recess 110 in mould half 22 so as to permit this sliding movement of the insert. The inserts have respective inwardly projecting peripheral edges 38b and 40b at their lower ends which co-operate with mandrel part 88 to cut off the surplus lower end portion of the parison when the mould halves are closed, as best seen in FIG. 2.

Movement of the two inserts between their advanced and retracted positions is effected under the control of respective pneumatic cylinder and ram devices 112 and 114 which are horizontally mounted behind the mould parts as seen in FIGS. 1 and 2. With continued reference to those views, it will be seen that the inserts 38 and 40 are shaped at their outer sides to define respective undercut slideways 116 and 118 which slidably interlock with associated actuator slides 120 and 122. These actuator slides are visible in plan in FIGS. 4 and 5 and it will be seen that they are coupled to the respective cylinder and ram devices 112 and 114. It will also be seen from those views that the slides 120 and 122, are generally wedge shaped and that the slideways 116 and 118 are inclined with respect to the joint line between the two mould halves 20 and 22. Thus, longitudinal movement of the respective slides 120 and 122 under the control of their associated cylinder and ram devices 112 and 114 will cause corresponding radial movement of the inserts 38 and 40 with respect to the mould cavity 24. For example, by retracting the rams of devices 112 and 114 and the associated slides 120 and 122 from the positions in which they are shown in FIG. 4, the inserts 38 and 40 will be drawn radially outwardly to their retracted positions as shown in FIG. 5. Conversely, by extending the rams of devices 112 and 114, the inserts 38 and 40 will be returned to their normal moulding positions.

The actuater slides 120 and 122 move back and forth on support brackets 124 and 126 which are attached to the respective mould halves 20 and 22 and to which the cylinder and ram devices 112 and 114 are also attached. Each slide is held against the associated support bracket by a pair of bolts which extend through a slot in the bracket permitting movement of the slide. The bolts for slide 120 are denoted 128 and those for slide 122 are denoted 130.

Referring back to FIGS. 1 and 2, a typical moulding sequence will now be described.

With the mould halves 20 and 22 in their open positions and mandrel assembly 46 retracted, the parison 42 is positioned over the exposed portion of the mandrel blow pin 48. Typically, the parison will be extruded into this position and supported at its upper end by the extrusion device. At this time, the cylinder and ram devices 112 and 114 associated with the mould inserts 38 and 40 will be actuated so that the inserts will be in their forward (moulding) positions and the fingers 52 will be in their normal rest positions adjacent blow pin 48. After the parison has reached the position shown in FIG. 1, the fingers 52 will be moved outwardly by actuating cylinder and ram device 56 to expand the lower end portion of the parison. Next, the mandrel assembly will move up into the position in which is shown in FIG. 2 inside the parison. The mould halves then close onto the mandrel assembly, trapping the parison.

Air pressure is now introduced into the parison through the mandrel blow pin 48. This expands the parison into contact with the mould halves and causes it to conform to the shape of the mould cavity. At the same time, the parison cools into a relatively rigid state. Air pressure is then released and the rams of the cylinder and ram devices 112 and 114 are retracted to retract the mould inserts 38 and 40 and relieve external pressure on the neck 30 of the moulded article.

Next, the mandrel assembly 46 is retracted to the position shown FIG. 1 and the mould halves open leaving the moulded article supported by the fingers 52 and slides 54. Finally, the moulded article is removed either manually or by an air cylinder actuated "wiper" mechanism in manner known per se. The inserts 38 and 40 are then returned to their forward positions ready for the next operation.

It will of course be appreciated that the preceeding description relates to a preferred embodiment of the invention only and that many modifications are possible within the broad scope of the invention.

For example, although one form of parison stretcher mechanism has been specifically described and illustrated and is believed to be a preferred mechanism, other mechanically equivalent devices may of course be used, although in some cases with less desirable results. One possibility is to provide a series of pivoted stretcher fingers which are grouped around the mandrel and are arranged so that, when the mandrel is advanced, it acts on the fingers to pivot them outwardly and expand the parison in the manner of a cam. Obviously, details such as the shape of the mould cavity may also be varied. The method and apparatus disclosed herein may be used for moulding other forms of articles; there is no limitation to articles of circular cross-section although special arrangements will obviously have to be provided for stretching the parison where the article is to be of non-circular shape.

The movable mould inserts 38 and 40 although desirable in the present instance, are not essential. For example, there would be no need for such inserts if the neck of the moulded article were plain. On the other hand, it will be appreciated that the movable insert mechanism disclosed herein may find application in forms of moulding apparatus other than that specifically disclosed herein. For example, such inserts might well be used to advantage in a conventional blow moulding apparatus.

I claim:

1. Apparatus for moulding hollow plastic articles, each having a body portion and a relatively wide neck at one end, the apparatus comprising;

a partible mould comprising mould parts movable between open and closed positions and defining in said closed position a mould cavity of a shape appropriate to the required external shape of the article and extending about a generally upright longitudinal axis, said mould cavity having adjacent one end thereof surface portions for defining said neck of the article;

means for positioning between the open mould parts generally on said axis a relatively narrow mouldable tubular parison with an open lower end portion of the parison extending beyond the said one end of the mould cavity;

means mechanically engageable with said end portion of the parison and adapted to expand said portion to a size approximating the required final size of the neck of the article while leaving said open lower end of the parison unobstructed, said means including: a plurality of parison engaging elements arranged to project into said open end portion of the parison generally parallel to said longitudinal axis of the mould cavity; a plurality of slide members corresponding to said plurality of parison engaging elements, each member supporting one of said elements at an inner end thereof with the element projecting upwardly from the member, generally normally therefrom; an annular housing defining a central opening and supporting said slide members for horizontal sliding movement radially of the housing along rectilinear paths disposed normal to said axis between first positions in which the elements are disposed closely adjacent one another to permit a parison to be positioned over said elements, and second positions in which the elements have been displaced outwardly to expand the parison; and means for simultaneously moving the elements between said first and second positions comprising an actuator ring supported by said housing for turning movement about an axis of said central opening defined by the housing; actuator means for turning said ring through a predetermined angular amount; and cam means coupling said actuator ring and said slide members and arranged to cause longitudinal sliding movement of the members in response to turning movement of the ring;

a mandrel movable through said central opening of the annular housing and into said open lower end of the parison between a retracted position clear of said mould parts and an advanced position within the parison, said mandrel being shaped to co-operate with said surface portions of the mould cavity when the mould is closed, to form the neck of the article;

means for closing the end of the parison opposite said one end; and, means for introducing air into the interior of the parison to cause the parison to expand, whereby the parison adopts the shape of the mould cavity.

2. Apparatus as claimed in claim 1 wherein said slide members define upper surfaces for contact by the lower end of a parison in position between said mould parts, whereby said members define said means for positioning the parison with an end portion thereof extending beyond said one end of the mould cavity.

3. Apparatus as claimed in claim 1 wherein said mandrel forms part of a mandrel assembly including a blow pin which projects upwardly from said mandrel and defines said means for introducing air into the interior of the parison, said pin extending to the end of said mould cavity opposite said one end, and said mould parts including surface portions co-operating with said pin and defining therewith said means for closing the end of the parison opposite said one end.

4. Apparatus as claimed in claim 1, further comprising a plurality of mould inserts carried each by one of said mould parts and defining said surface portions of the mould cavity, each said insert being movable between a forward, normal moulding position for co-operation with said mandrel, and a retracted position for relieving pressure between said mould parts and said mandrel; and means for moving the inserts between their moulding positions and retracted positions.

5. Apparatus as claimed in claim 4, wherein each insert includes an inwardly projecting edge portion which co-operates with the mandrel to sever from the parison said end portion extending beyond said one end of the mould cavity when the mould parts are closed with said inserts in their forward moulding positions.

6. Apparatus as claimed in claim 4, wherein said mould parts comprise two mould halves each including one of said inserts, said inserts being movable towards and away from one another generally radially in the mould cavity, and wherein said means for moving the inserts between their forward positions and retracted positions comprise, in association with each insert, an actuator slide movable in a direction generally normal to said radial direction; actuator means for moving said slide; and co-operating inclined slide ways between said actuator slide and said insert arranged to cause radial movement of the insert in response to longitudinal movement of the actuator slide.

* * * * *